Patented July 11, 1939

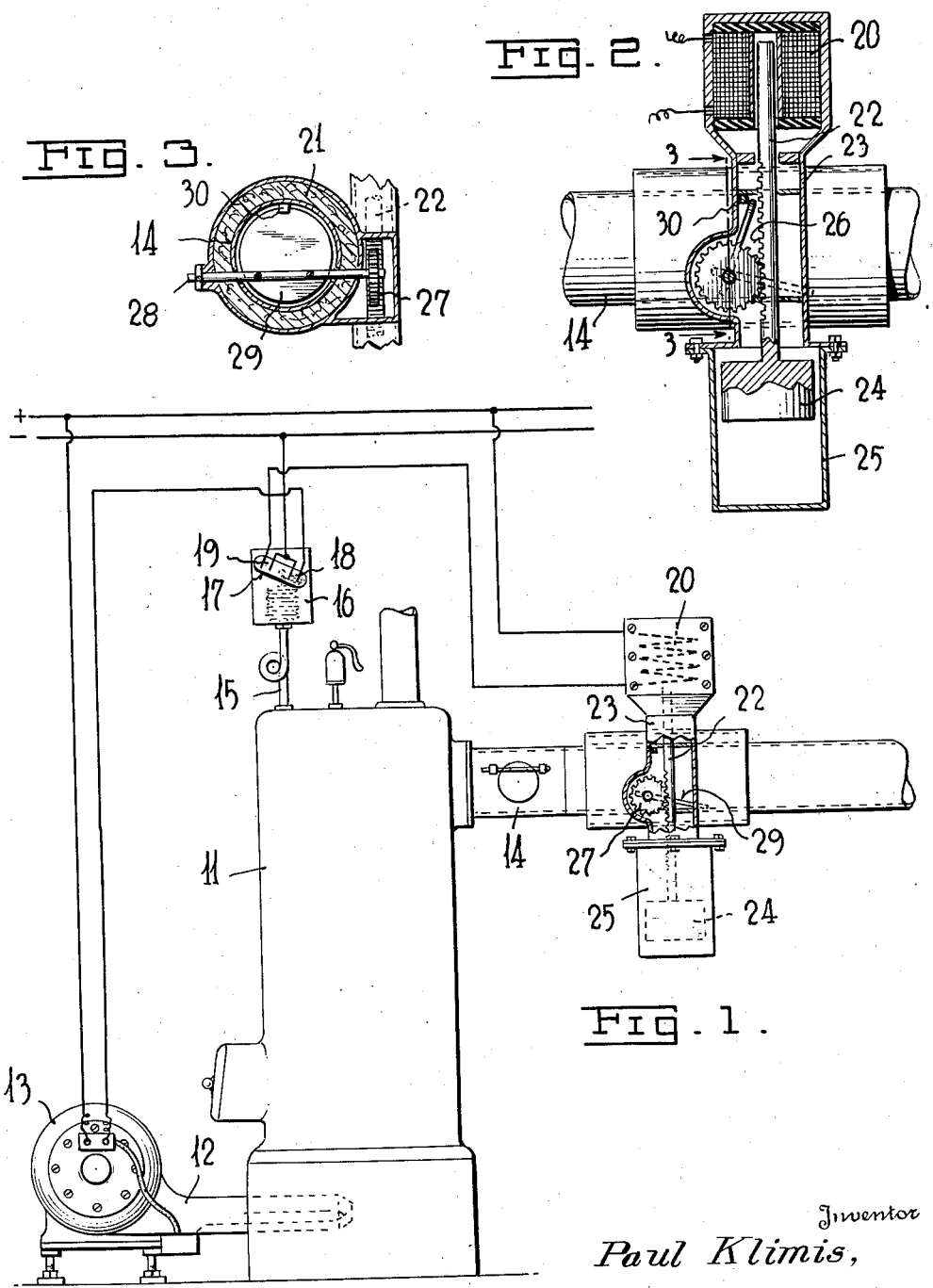

2,165,488

UNITED STATES PATENT OFFICE 2,165,488

CONTROL DEVICE FOR HEATING SYSTEMS

Paul Klimis, New York, N. Y.

Application July 29, 1937, Serial No. 156,411

4 Claims. (Cl. 236—1)

The invention relates particularly to automatic heating devices in which a steam boiler is heated by a liquid or gaseous fuel burner. With such devices is associated a mechanism for starting or stopping the burner in accordance with the conditions of the system or of the apartment or building to be heated. Generally an electric motor is employed to operate the burner and the fumes of the burner are led from the heater to and through an outlet flue. The draft through the outlet flue generally is at least in part a natural draft and will usually continue to some extent at least whether or not the burner is in operation. The air drawn into the heater when the burner is in operation is heated and in that condition passes through the heater. Whenever the burner is stopped cold air may be drawn through the heater and cool it, thus wasting thermal units. It is a purpose of the present invention to provide mechanism associated with the burner to insure the damper in the flue being in open position while the burner operates but to move the damper to closed position when the burner ceases to operate so as to retain in the heater the heated air and thus not lose the thermal units therein. The operation of the mechanism for moving or controlling the damper is preferably automatic. The mechanism for starting and stopping the burner is preferably automatic. These automatic mechanisms are preferably controlled in the present instance by the pressure of the steam in the steam chamber of the heater. Preferably the control mechanism is electrically operated.

In the accompanying drawing is shown in a more or less diagrammatic way one specific embodiment of the invention. Figure 1 is a diagrammatic side view of a burner, heater, flue and control mechanism, portions being broken away to show the internal structure. Fig. 2 is a side elevation on a somewhat enlarged scale of a portion of the flue and the damper, portions being broken away to show the internal mechanism. Fig. 3 is a transverse vertical section on the line 3—3 of Fig. 2. A heater 11 is illustrated as provided with an electric motor 13. Leading from the heater 11 is a flue 14. A pipe 15 connects the steam chamber of the heater 11 with a device 16 which is responsive to steam pressure. Associated with the pressure responsive device 16 is an electric switch 17. In the present instance this is illustrated as a tilting mercury switch but other suitable switches may be used. The mechanism so far described may be of usual and ordinary construction and consequently the details are not shown and will not be described. In the position indicated in Fig. 1 the pressure of the steam in the steam chamber is less than the desired maximum to be predetermined and for which the switch is to be set. It will be noted that the right hand side of the switch 17 is depressed and the mercury closes the contacts 18. In this condition current comes from the plus (+) side of the line through the motor 13 through the contacts 18 and to the negative (—) side of the line. In this condition the burner will operate. When the steam pressure rises to the predetermined point it will throw the switch 17 and this is pivoted so that the left hand side will be down and the mercury will shift and open the contacts 18. This will stop the burner and at the same time close a circuit through the contacts 19 from the positive (+) side of the line through the coil of a solenoid 20 to the negative (—) side of the line. It will be noted that while the burner has been operating the circuit of the solenoid 20 has been open and when the motor ceases to operate the circuit of the solenoid 20 is closed. The solenoid 20 is mounted on the flue 14 at a point which is preferably provided with insulation 21 to protect the solenoid 20 from the heat. The solenoid 20 is provided with a core 22 illustrated as extending vertically downward from the solenoid 20. A casing 23 encloses the solenoid 20 and core 22. At its lower end the core 22 is provided with a weight 24 in a casing 25 attached to the casing 23. Above the weight 24 the core 22 is provided with a rack 26 which engages a pinion 27 mounted on an extension of a shaft 28. The shaft 28 is mounted in bearings in the flue 14. The shaft 28 extends horizontally across the flue 14 preferably somewhat below the horizontal diameter of the flue opening, and eccentrically mounted on the shaft 28 is a damper 29. The damper 29 is somewhat smaller in diameter than the internal diameter of the flue 14. Because of this difference in size there is always an opening in the flue even when the damper 29 is closed, to allow exit of noxious or explosive fumes if any such occur, from the heater. This difference in size also makes it possible to mount the damper 29 eccentrically on the shaft 28 and still allow it to tip or turn in the flue. It will be understood that movement of the rack 26 carried by the core 22 will move the pinion 27 to turn the damper 29 on its axis 28. When the solenoid 20 is energized it will raise the core 22 and throw the damper to the nearly vertical position illustrated in full lines in Fig. 2. In this position the damper will be more or less vertical but its movement is limited by a stop 30 mounted in the top of the flue. The damper is thus held inclined. The upper portion of the damper outweighs the portion of the damper below the axis 28 and there is, therefore, a constant tendency of the damper to fall to the position indicated by dotted lines in Fig. 2 which is the position it is desired the damper should take when the solenoid 20 is de-energized. In order to insure the damper taking the dotted line position indicated in Fig. 2 a weight 24 is provided at the bottom of the core 22. The solenoid 20, when energized, lifts the weight 24. When the solenoid 20 is de-energized the weight 24 insures positive movement of the rack 26 downward and, through the pinion 27, positively moves the damper 29 to the open position indicated in dotted lines in Fig. 2. (Full lines in Fig. 1.)

It will be seen thus that in the normal de-energized position of the apparatus when the heater is cold and there is no current in the apparatus the switch 17 will lie in the position indicated in Fig. 1 and the damper will lie in the position indicated in dotted lines in Fig. 2. When the current is turned on the burner circuit is closed through the contacts 18 and ignition may begin. The contacts 19, however, are open and the damper 29 will remain in the position indicated in dotted lines in Fig. 2. As the pressure of the steam rises to the predetermined point the switch 17 will be actuated and the contacts 18 opened thus stopping the operation of the burner 12. This movement of the switch 17 will close the contacts 19 and energize the solenoid 20 to move the damper 29 to the position indicated in full lines in Fig. 2 thus more or less closing the flue 14 and retaining in the heater the heated gases. The apparatus will remain in this condition until the steam pressure falls to the predetermined point when the switch 17 will again be turned to open the contacts 19 and de-energize the solenoid allowing the damper 29 to be thrown to the position indicated by dotted lines in Fig. 2. This movement of the switch 17 will close the contacts 18 and start the operation of the burner 12. This operation will be repeated so long as the current is closed on the device.

Specific details of the mechanism illustrated are not essential to the present invention which may be embodied in other forms of apparatus.

I claim as my invention:

1. In a heating system a steam chamber, a fuel burner, a motor operating the burner, an outlet flue, a damper in the flue, means in the flue for mounting the damper on a horizontal axis below its diameter, a pinion on the axis, a vertically extending rack engaging the pinion, a weight on the rack normally holding the damper in open position, a solenoid above the rack which when engaged moves the damper to closed position, a switch actuated by the pressure in the steam chamber, contacts on the switch closing a circuit through the solenoid only when the pressure is above a predetermined maximum, and contacts on the switch closing a circuit through the motor only when the pressure is below a predetermined minimum.

2. In a heating system comprising a steam chamber, a fuel burner, a motor operating the burner, an outlet flue, a damper in the flue, means in the flue for mounting the damper on a horizontal axis, a pinion on the axis, a rack engaging the pinion, a weight on the rack normally holding the damper in open position, a solenoid on the rack which when energized moves the damper to closed position, a switch actuated by the pressure in the steam chamber, contacts on the switch closing a circuit through the solenoid only when the pressure is above a predetermined maximum, and contacts on the switch closing a circuit through the motor only when the pressure is below a predetermined minimum.

3. In a heating system comprising a steam chamber, a fuel burner, a motor operating the burner, an outlet flue, a damper in the flue, means in the flue for mounting the damper on a horizontal axis below its diameter, a pinion on the axis, a vertically extending rack engaging the pinion, a weight on the rack normally holding the damper in open position, a solenoid above the rack which when engaged moves the damper to closed position, a stop limiting the closure to an unbalanced position of the damper, a switch actuated by the pressure in the steam chamber, contacts on the switch closing a circuit through the solenoid only when the pressure is above a predetermined maximum, and contacts on the switch closing a circuit through the motor only when the pressure is below a predetermined minimum.

4. In a heating system comprising a steam chamber, a fuel burner, a motor operating the burner, an outlet flue, a damper in the flue, a weight normally holding the damper in open position, a solenoid which when energized moves the damper to closed position, a switch actuated by the pressure in the steam chamber, contacts on the switch closing a circuit through the solenoid only when the pressure is above a predetermined maximum, and contacts on the switch closing a circuit through the motor only when the pressure is below a predetermined minimum.

PAUL KLIMIS.